United States Patent
Liu et al.

(10) Patent No.: US 12,360,904 B2
(45) Date of Patent: Jul. 15, 2025

(54) FAST SYNCHRONIZATION MECHANISM FOR HETEROGENEOUS COMPUTING

(71) Applicant: MediaTek Inc., Hsinchu (TW)

(72) Inventors: Hsing-Chuang Liu, Hsinchu (TW); Yu-Shu Chen, Hsinchu (TW); Hong-Yi Chen, Hsinchu (TW)

(73) Assignee: MediaTek Inc., Hsinchu (TW)

( * ) Notice: Subject to any disclaimer, the term of this patent is extended or adjusted under 35 U.S.C. 154(b) by 0 days.

(21) Appl. No.: 18/473,514

(22) Filed: Sep. 25, 2023

(65) Prior Publication Data
US 2025/0103498 A1    Mar. 27, 2025

(51) Int. Cl.
*G06F 12/00* (2006.01)
*G06F 12/02* (2006.01)
*G06F 12/0808* (2016.01)
*G06F 12/0815* (2016.01)
*G06F 12/0831* (2016.01)

(52) U.S. Cl.
CPC ...... *G06F 12/0831* (2013.01); *G06F 12/0284* (2013.01); *G06F 12/0808* (2013.01); *G06F 12/0815* (2013.01); *G06F 12/0833* (2013.01)

(58) Field of Classification Search
CPC ............. G06F 12/0804; G06F 12/0806; G06F 12/0808; G06F 12/0815; G06F 12/0831; G06F 12/0833
See application file for complete search history.

(56) References Cited

U.S. PATENT DOCUMENTS

| | | | |
|---|---|---|---|
| 2018/0143903 A1* | 5/2018 | Wu | G06F 12/121 |
| 2018/0165196 A1* | 6/2018 | Bernat | G06F 13/1663 |
| 2020/0202012 A1* | 6/2020 | Shanbhogue | G06F 12/0804 |
| 2023/0185716 A1* | 6/2023 | Awan | G06F 12/0831 |
| | | | 711/146 |

* cited by examiner

*Primary Examiner* — Reginald G Bragdon
*Assistant Examiner* — Michael L Westbrook
(74) *Attorney, Agent, or Firm* — Tong J. Lee

(57) ABSTRACT

A heterogeneous computing system performs data synchronization. The heterogeneous computing system includes a system memory, a cluster, and a processing unit outside the cluster. The cluster includes a sync circuit, inner processors, and a snoop filter. The sync circuit is operative to receive a sync command indicating a sync address range. The sync command is issued by one of the processing unit and the inner processors. The sync circuit further determines whether addresses recorded in the snoop filter fall within the sync address range. In response to a determination that a recorded address falls within the sync address range, the sync circuit notifies a target one of the inner processors that owns a cache line having the recorded address to take a sync action on the cache line.

14 Claims, 4 Drawing Sheets

FAST SYNCHRONIZATION MECHANISM FOR HETEROGENEOUS COMPUTING

TECHNICAL FIELD

Embodiments of the invention relate to a heterogeneous computing system; more specifically, to a heterogeneous computing system that supports data synchronization between system memory and processor caches.

BACKGROUND OF THE INVENTION

A shared memory model provides a unified address space across a system memory and multiple caches. In a heterogeneous computing system where different types of processors coexist, data synchronization keeps data consistent across different types and different hierarchies of memory devices.

In some conventional systems, a central processing unit (CPU) issues a sync command for each address in an address range to be synchronized. For example, for an address range of one megabyte (more precisely, 1,048,576 bytes) and 128 bytes per cache line, there are 8192 cache line addresses in the address range. A CPU in a conventional system would issue 8192 sync commands to a processor cluster, one sync command at a time, to synchronize all 8192 cache lines in the cluster with the system memory. In response, the processors in the cluster would search their data caches for each sync command to determine whether to take sync actions. Conventional data synchronization consumes a lot of processing cycles.

Therefore, there is a need for designing a data synchronization mechanism that is efficient and has low overhead.

SUMMARY OF THE INVENTION

In one embodiment, a heterogeneous computing system is provided to perform data synchronization. The heterogeneous computing system includes a system memory and a cluster coupled to the system memory via a system bus. The cluster includes a sync circuit, inner processors, and a snoop filter coupled to the sync circuit and the inner processors. The heterogeneous computing system further includes a processing unit outside the cluster and coupled to the cluster and the system memory via the system bus. The sync circuit is operative to receive a sync command indicating a sync address range. The sync command is issued by one of the processing unit and the inner processors. The sync circuit further determines whether addresses recorded in the snoop filter fall within the sync address range. In response to a determination that a recorded address falls within the sync address range, the sync circuit notifies a target one of the inner processors that owns a cache line having the recorded address to take a sync action on the cache line.

In another embodiment, a method of a sync circuit is provided for performing data synchronization in a heterogeneous computing system. The heterogeneous computing system includes a cluster of inner processors and a processing unit outside the cluster. The cluster further includes the sync circuit and a snoop filter. The method includes the step of receiving, by the sync circuit, a sync command indicating a sync address range, the sync command issued by one of the processing unit and the inner processors; determining whether addresses recorded in the snoop filter fall within the sync address range, and in response to a determination that a recorded address falls within the sync address range, sending a notification from the sync circuit to a target one of the inner processors that owns a cache line having the recorded address to take a sync action on the cache line.

Other aspects and features will become apparent to those ordinarily skilled in the art upon review of the following description of specific embodiments in conjunction with the accompanying figures.

BRIEF DESCRIPTION OF DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

DETAILED DESCRIPTION OF THE INVENTION

In the following description, numerous specific details are set forth. However, it is understood that embodiments of the invention may be practiced without these specific details. In other instances, well-known circuits, structures, and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

Embodiments of the invention provide a method, apparatus, and system for performing fast synchronization in a heterogeneous multi-processor computing system. A dedicated synchronization circuit, referred to as a sync circuit, uses the information recorded in a snoop filter to identify cache line address to be synchronized, and target processors to perform sync actions. The sync actions may include invalidation and write-back. The sync circuit performs address comparisons for a processor cluster when a processor (e.g., a CPU) outside the processor cluster issues a sync command to synchronize data across the cluster boundary. The processors in the cluster are herein referred to as the "inner processors." The sync circuit not only offloads the comparison operations from the inner processors but also utilizes snoop filter information to speed up the comparison process.

Figure 1:
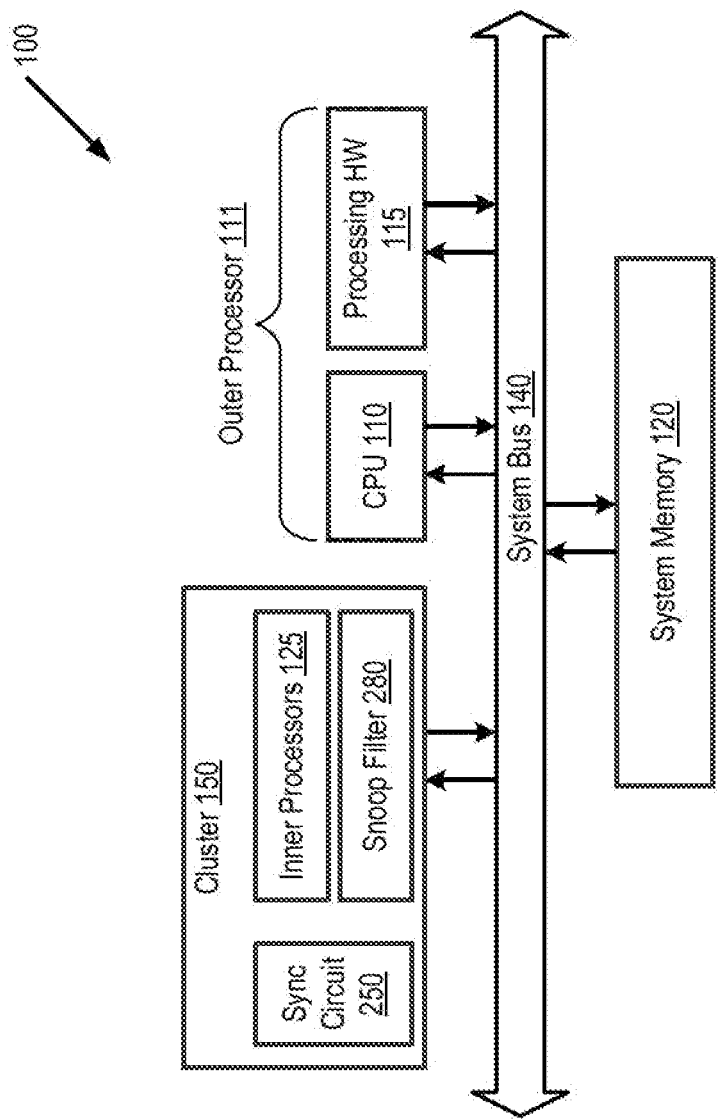
FIG. 1 is a diagram illustrating a heterogeneous computing system according to one embodiment.

FIG. 1 is a diagram illustrating a heterogeneous computing system 100 ("system 100") according to one embodiment. The term "heterogeneous computing system" herein refers to a multiprocessor system that includes processors having different instruction set architectures (ISAs) and/or processors having the same ISA but different microarchitectures. System 100 includes a central processing unit (CPU) 110 and other processors and accelerators (collectively referred to as processing hardware 115). Non-limiting examples of processing hardware 115 may include one or more processors including but not limited to a CPU, a graphics processing unit (GPU), a digital signal processor (DSP), a neural processing unit (NPU), a microprocessor, an image processing unit, a deep learning accelerator (DLA), and the like. System 100 further includes at least one cluster 150 of processors, which are also referred to as inner processors 125. A non-limiting example of cluster 150 includes multiple processors or multiple cores (e.g., a multicore cluster) performing symmetric multiprocessing (SMP); e.g., inner processors 125 have the same ISA and the same microarchitecture. Inner processor 125 may be a CPU with the same ISA as CPU 110 or a different ISA from CPU 110. A non-limiting example of inner processor 125 is an ARM® MPcore processor. It is understood that the fast sync mechanism described herein can also be applied to heterogeneous inner processors.

As CPU 110 and processing hardware 115 are outside of cluster 150, CPU 110 and processing hardware 115 (e.g., GPU, MPU, DSP, DLA, etc.) may also be referred to as outer processors 111. Outer processors 111 and inner processors 125 may be manufactured by the same vendor or different vendors. Cluster 150 is coupled to CPU 110, processing hardware 115, and a system memory 120 via a system bus 140. System memory 120 may include a dynamic random-access memory (DRAM), flash memory, a static random-access memory (SRAM), and/or other volatile or non-volatile memory devices. In one embodiment, CPU 110, processing hardware 115, and cluster 150 are located on the same system-on-a-chip (SOC).

In one embodiment, one or more of outer processors 111 (e.g., CPU 110) may perform a task allocated with an address segment. A portion of the task, as well as a portion of the address segment, is assigned to one or more of inner processors 125. To ensure data is synchronized across system 100, CPU 110 issues a sync command to cluster 150 to trigger a sync action. Alternatively, an inner processor 125 in cluster 150 may issue a sync command to trigger a sync action. The sync command specifies an address range and a sync action. In some embodiments, the sync command may further specify one or more inner processors 125 as target processors. The address range in the sync command indicates a range of addresses to be synchronized. More specifically, if a target processor's data cache contains a cache line having an address within the address range, that cache line will be synchronized according to the sync action; that is, the target processor is to either write back the cache line to system memory 120, or invalidate the cache line in its data cache to allow that cache line to be overwritten. In one embodiment, the address comparison is performed by a sync circuit 250 to speed up the sync process.

In one embodiment, system 100 adopts a data coherence protocol to keep track of the latest version of each data item. The data coherence protocol may use techniques such as invalidation, update propagation, or snooping to ensure that changes made by one processor are visible to other processors sharing the same data. In one embodiment, cluster 150 includes a snoop filter 280 to keep track of the latest version of the data items owned by inner processors 125. In one embodiment, sync circuit 250 utilizes information provided by a snoop filter 280 to improve the efficiency of data synchronization.

For example, CPU 110 may issue a sync command for a sync address range of one megabyte. If an inner processor's data cache is 32 kilobytes and there are 128 bytes per cache line, sync circuit 250 may perform 32K/128=256 data comparisons for synchronizing that data cache, regardless of the size of the address range in the sync command. Further details on the sync circuit operations are provided below.

In another scenario, the sync address range (e.g., N addresses) may be smaller than the address range of an inner processor's data cache. Thus, sync circuit 250 may perform N comparisons for synchronizing the data cache. If a given address in the sync address range is recorded in snoop filter 280, sync circuit 250 may notify a given inner processor that owns the cache line having the given address to synchronize the given cache line with system memory 120.

Figure 2:
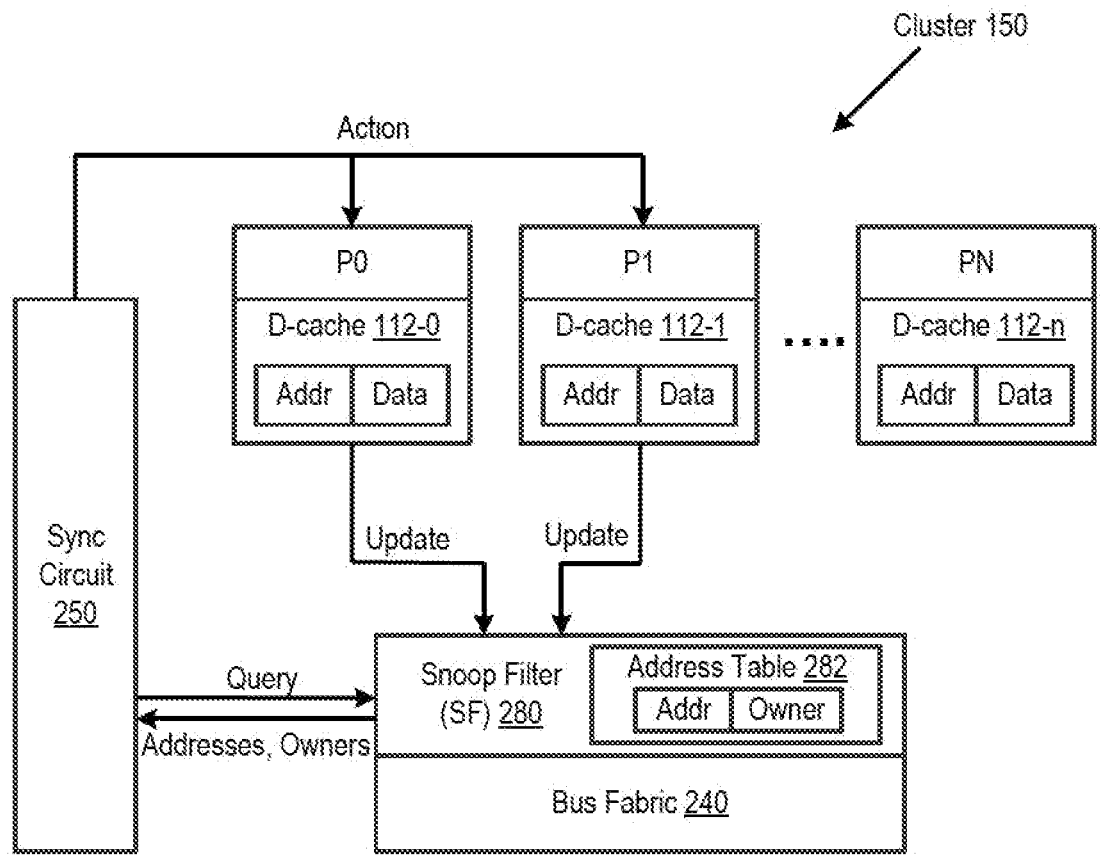
FIG. 2 is a block diagram illustrating a processor cluster according to one embodiment.

FIG. 2 is a block diagram illustrating a processor cluster according to one embodiment. The description of FIG. 2 also refers to FIG. 1. An example of a processor cluster is cluster 150, which includes N inner processors P0-PN. It is understood that cluster 150 may include any number of processors greater than one. Cluster 150 further includes sync circuit 250 and snoop filter 280. Inner processors P0-PN and snoop filter 280 are coupled to a bus fabric 240, which further connects to system bus 140. Inner processors include or are coupled to respective data caches 112-0 to 112-*n*.

Snoop filter 280 includes an address table 282, which records the address of each cache line and its owner (which is one of the inner processors). Snoop filter 280 updates address table 282 every time a change is made by an inner processor to a cache line. To initiate data synchronization, CPU 110 sends a sync command to a designated inner processor (e.g., P0), where the sync command specifies an address range, sync action (e.g., write back or invalidate), and target processors. For example, the sync command may indicate P0 and P1 as target processors. Only the target processors' data caches are to be synchronized with system memory 120. Thus, sync circuit 250 only needs to compare the addresses in address table 282 that are owned by the target processors.

Figure 3:
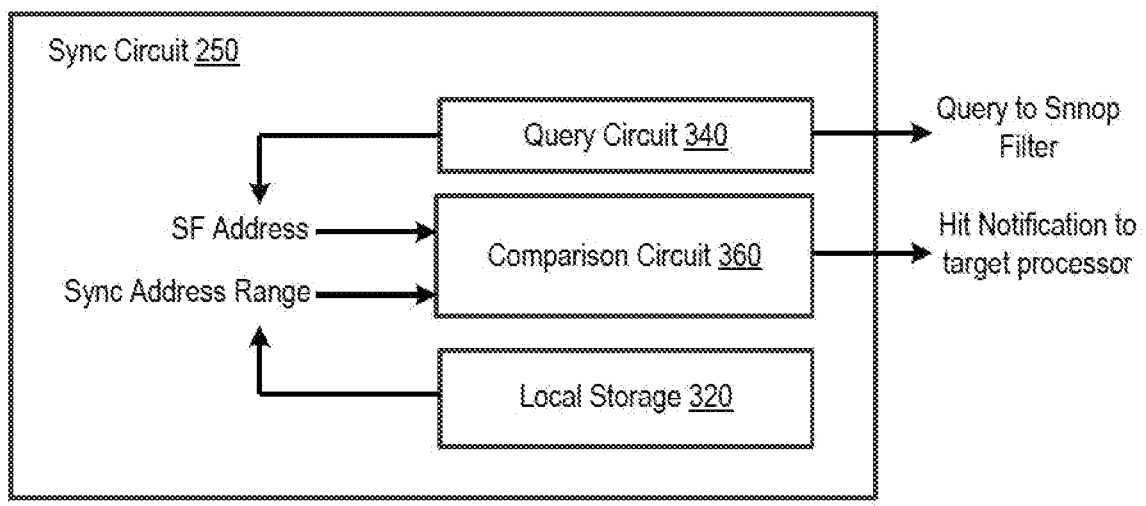
FIG. 3 is a block diagram illustrating an example of a sync circuit according to one embodiment.

FIG. 3 is a block diagram illustrating an example of a sync circuit according to one embodiment. An example of the sync circuit is sync circuit 250 in FIG. 1 and FIG. 2. In one embodiment, sync circuit 250 includes a local storage 320 (e.g., registers, DRAM, SRAM, and/or the like) to store the information in the sync command, such as sync address range, target processors, and sync action. Sync circuit 250 also includes a query circuit 340 to query snoop filter 280 for addresses owned by the target processors. Sync circuit 250 also includes a comparison circuit 360 to compare the addresses obtained from snoop filter 280 with the sync address range. Comparison circuit 360 generates a hit signal when a snoop filter address falls within the sync address range. Sync circuit 250 sends the hit signal to the target processor (i.e., one of the inner processors) so that the target processor can perform the sync action accordingly.

Figure 4:
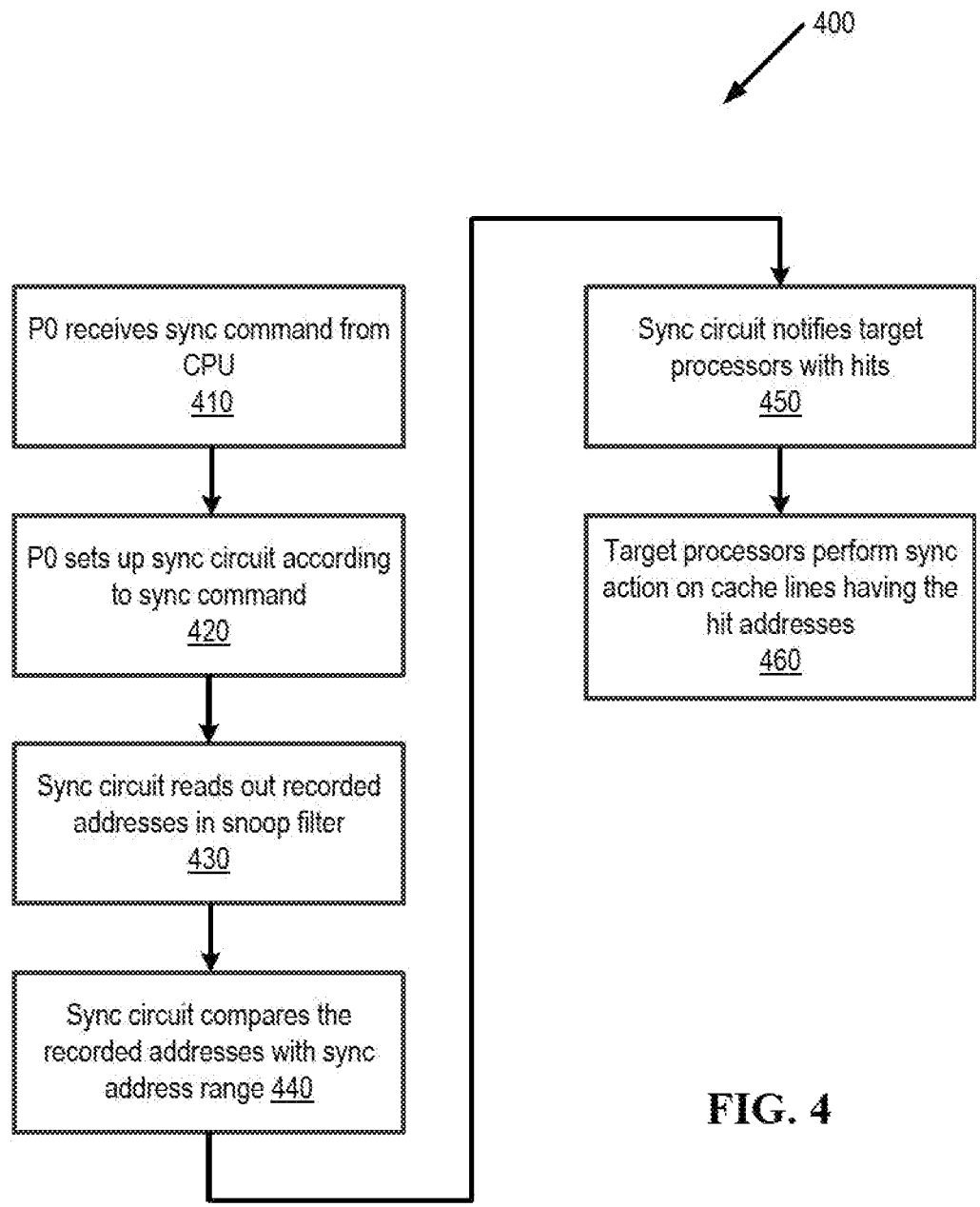
FIG. 4 is a flow diagram illustrating an example process for data synchronization according to one embodiment.

FIG. 4 is a flow diagram illustrating an example process for data synchronization according to one embodiment. Referring also to the example in FIG. 2, inner processor P0 is the designated processor in cluster 150 to receive sync commands. P0 receives a sync command at step 410 indicating inner processors P0 and P1 are the target processors. The sync command further indicates a sync address range and a sync action, which may be invalidate or write-back. At step 420, the designated processor P0 sets up (e.g., configures) sync circuit 250 according to the sync command. For example, sync circuit 250 may store the target processors, the sync address range, and the sync action in the sync command into local storage 320 (FIG. 3). Sync circuit 250 at step 430 reads out (e.g., takes a snapshot of) the addresses recorded in snoop filter 280; more specifically, the addresses that are owned by the target processors. Sync circuit 250 at step 440 compares the recorded addresses in the snapshot with the sync address range. If a recorded address falls within the sync address range (i.e., a hit), sync circuit 250 at step 450 generates a hit signal indicating that recorded address (i.e., hit address). The hit signal notifies the target processor that owns the cache line having the hit address. The target processor at step 460 performs the sync action on the cache line having the hit address.

If a recorded address is not within the sync address range (i.e., a miss), sync circuit 250 continues to compare the next recorded address in the snapshot. In a scenario where the sync address range is greater than the address range of the recorded addresses, the compare operation at step 440 (as well as steps 450-460 if there is a hit) may repeat until all of the recorded addresses in the snapshot are compared with the sync address range. In another scenario where the sync address range is less than the address range of the recorded addresses, the compare operation at step 440 (as well as steps 450-460 if there is a hit) may repeat until all of the addresses in the sync address range are compared with the recorded addresses in the snapshot.

Figure 5:
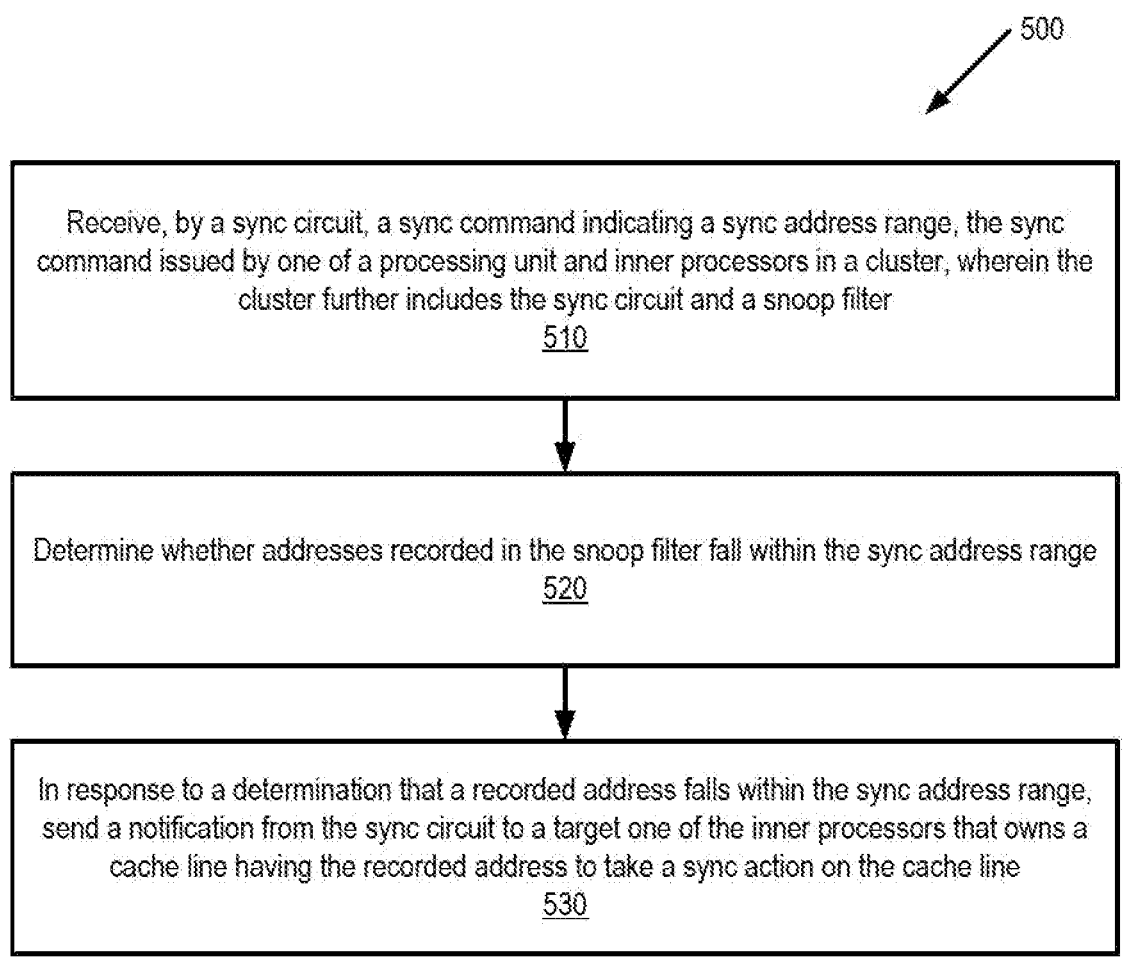
FIG. 5 is a flow diagram illustrating a method for data synchronization according to one embodiment.

FIG. 5 is a flow diagram illustrating a method 500 for data synchronization according to one embodiment. In one embodiment, method 500 may be performed by a sync circuit, such as sync circuit 250 (FIG. 1, FIG. 2, and FIG. 3).

Method 500 starts with step 510 in which a sync circuit receives a sync command indicating a sync address range. The sync command is issued by one of a processing unit outside a cluster and inner processors in the cluster. In the example of FIG. 1, "one of a processing unit and inner processors" may be CPU 110 or an inner processor 125. The cluster includes the sync circuit, the inner processors, and a snoop filter. The sync circuit at step 520 determines whether the addresses recorded in the snoop filter fall within the sync address range. In response to a determination that a recorded address falls within the address range, the sync circuit at step 530 sends a notification to a target inner processor that owns a cache line having the recorded address to take a sync action on the cache line.

In one embodiment, in response to another determination that a given address in the sync address range is recorded in the snoop filter, the sync circuit sends another notification to a given inner processor that owns a given cache line having the given address to synchronize the given cache line with the system memory.

In one embodiment, the sync command indicates a subset of the inner processors as targets for synchronization. The sync circuit is operative to receive from the designated inner processor the address range, the targets, and the sync action to be performed by the targets. The sync circuit is further operative to compare each of the addresses recorded in the snoop filter and owned by the targets with the sync address range. The sync circuit is operative to send a query to the snoop filter, and receives a snapshot of the addresses recorded in the snoop filter and the respective owners of the addresses for address comparison. The sync action may include invalidating the cache line or writing back the cache line to a system memory. The snoop filter is operative to update its address table to indicate a change made by the target processor to the cache line.

In one embodiment, the processing unit is a CPU and the inner processors form a multi-core cluster that performs symmetric multiprocessing (SMP). In one embodiment, the processing unit and the cluster are located on the same system-on-a-chip (SOC).

The operations of the flow diagrams of FIG. 4 and FIG. 5 have been described with reference to the exemplary embodiments of FIG. 1, FIG. 2, and FIG. 3. However, it should be understood that the operations of the flow diagrams of FIG. 4 and FIG. 5 can be performed by embodiments of the invention other than the embodiments of FIG. 1, FIG. 2, and FIG. 3, and the embodiments of FIG. 1, FIG. 2, and FIG. 3 can perform operations different than those discussed with reference to the flow diagrams. While the flow diagrams of FIG. 4 and FIG. 5 show a particular order of operations performed by certain embodiments of the invention, it should be understood that such order is exemplary (e.g., alternative embodiments may perform the operations in a different order, combine certain operations, overlap certain operations, etc.).

Various functional components or blocks have been described herein. As will be appreciated by persons skilled in the art, the functional blocks will preferably be implemented through circuits (either dedicated circuits or general-purpose circuits, which operate under the control of one or more processors and coded instructions), which will typically comprise transistors that are configured in such a way as to control the operation of the circuitry in accordance with the functions and operations described herein.

While the invention has been described in terms of several embodiments, those skilled in the art will recognize that the invention is not limited to the embodiments described, and can be practiced with modification and alteration within the spirit and scope of the appended claims. The description is thus to be regarded as illustrative instead of limiting.

What is claimed is:

1. A heterogeneous computing system operative to perform data synchronization, comprising:
   a system memory;
   a cluster coupled to the system memory via a system bus, the cluster including a sync circuit, a plurality of inner processors, and a snoop filter coupled to the sync circuit and the inner processors, wherein the snoop filter records addresses of cache lines owned by the inner processors in the cluster; and
   a central processing unit (CPU) outside the cluster and coupled to the cluster and the system memory via the system bus, wherein the CPU is operative to send a sync command to a designated one of the inner processors, the sync command indicating a sync address range and one or more target inner processors in the cluster;
   wherein the designated inner processor configures the sync circuit according to the sync command, the sync circuit operative to:
      compare each address recorded in the snoop filter and owned by the one or more target inner processors with the sync address range; and
      in response to a determination that a recorded address falls within the sync address range, notify a target inner processor that owns a cache line having the recorded address to take a sync action on the cache line.

2. The heterogeneous computing system of claim 1, wherein the sync circuit is further operative to:
   in response to another determination that a given address in the sync address range is recorded in the snoop filter, notify a given one of the inner processors that owns a given cache line having the given address to synchronize the given cache line with the system memory.

3. The heterogeneous computing system of claim 1, wherein the sync circuit is further operative to:
send a query to the snoop filter; and
receive a snapshot of the addresses recorded in the snoop filter and respective owners of the addresses for address comparison.

4. The heterogeneous computing system of claim 1, wherein the sync action includes one of invalidate the cache line and write-back the cache line to the system memory.

5. The heterogeneous computing system of claim 1, wherein the snoop filter is operative to update an address table to indicate a change made by the target inner processor to the cache line.

6. The heterogeneous computing system of claim 1, wherein the inner processors form a multi-core cluster that performs symmetric multiprocessing (SMP).

7. The heterogeneous computing system of claim 1, wherein the CPU and the cluster are located on a same system-on-a-chip (SOC).

8. A method of a sync circuit for performing data synchronization in a heterogeneous computing system that includes a cluster of inner processors and a central processing unit (CPU) outside the cluster, comprising:
receiving, by a designated one of the inner processors from the CPU, a sync command indicating a sync address range and one or more target inner processors in the cluster, wherein the cluster further includes the sync circuit and a snoop filter that records addresses of cache lines owned by the inner processors in the cluster;
the designated inner processor configuring the sync circuit according to the sync command;
comparing, by the sync circuit, each address recorded in the snoop filter and owned by the one or more target inner processors with the sync address range; and
in response to a determination that a recorded address falls within the sync address range, sending a notification from the sync circuit to a target inner processor that owns a cache line having the recorded address to take a sync action on the cache line.

9. The method of claim 8, further comprising:
in response to another determination that a given address in the sync address range is recorded in the snoop filter, sending another notification from the sync circuit to a given one of the inner processors that owns a given cache line having the given address to synchronize the given cache line with the system memory.

10. The method of claim 8, further comprising:
sending a query from the sync circuit to the snoop filter; and
receiving a snapshot of the addresses recorded in the snoop filter and respective owners of the addresses for address comparison.

11. The method of claim 8, wherein the sync action includes one of invalidate the cache line and write-back the cache line to the system memory.

12. The method of claim 8, wherein the snoop filter is operative to update an address table to indicate a change made by the target inner processor to the cache line.

13. The method of claim 8, wherein the inner processors form a multi-core cluster that performs symmetric multiprocessing (SMP).

14. The method of claim 8, wherein the CPU and the cluster are located on a same system-on-a-chip (SOC).

\* \* \* \* \*